United States Patent [19]

Widmer et al.

[11] 4,151,373
[45] Apr. 24, 1979

[54] DATA TRANSMISSION SYSTEM

[75] Inventors: Walter R. Widmer, Niederhasli; Hans-Jorg Klemenz, Dielsdorf; Pierre Schmid, Oberweningen, all of Switzerland

[73] Assignee: Gretag Aktiengesellschaft, Regensdorf, Switzerland

[21] Appl. No.: 831,297

[22] Filed: Sep. 7, 1977

[30] Foreign Application Priority Data

Sep. 9, 1976 [CH] Switzerland .................. 11445/76

[51] Int. Cl.² .......................................... H04J 3/06
[52] U.S. Cl. ............................ 179/15 AF; 179/15 BS
[58] Field of Search ................ 179/15 BS, 15 AF; 178/69.1

[56] References Cited

U.S. PATENT DOCUMENTS 4,025,720  5/1977  Pachynski .................. 179/15 BS

Primary Examiner—Kathleen H. Claffy
Assistant Examiner—Joseph A. Popek
Attorney, Agent, or Firm—Burns, Doane, Swecker & Mathis

[57] ABSTRACT

A system for inserting extra-information bits into a bit sequence to be transmitted over a transmission channel and for suppressing such bits from the transmitted bit sequence, the system having an inserter at the transmitting end and a suppressor at the receiving end, the inserter converting an input bit sequence which it receives at a first repetition frequency into a second repetition frequency which is higher to correspond to the inserted extra bits, by the insertion of m extra bits per m.k.n bits of the input bit sequence k, n and m denoting integers which are greater than zero, the suppressor restoring the original input bit sequence at the first repetition frequency and the extra-information bits from the output bit sequence which it receives from the transmitter at the second repetition frequency, the inserter comprising a first repetition frequency generator which derives the output bit sequence repetition frequency from the input sequence repetition frequency and complies with the condition $n.k \geq 50$.

10 Claims, 7 Drawing Figures

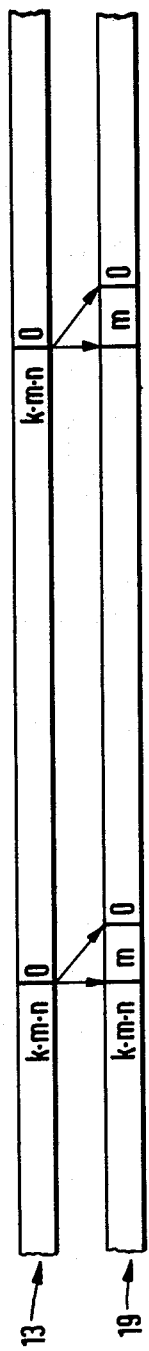
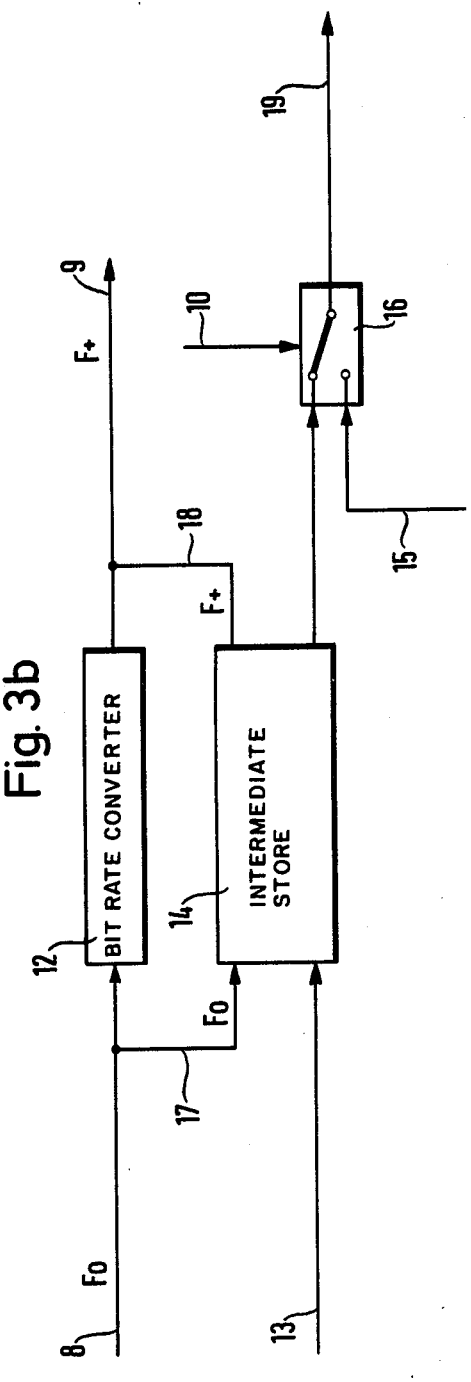
Fig. 3a
Fig. 3b

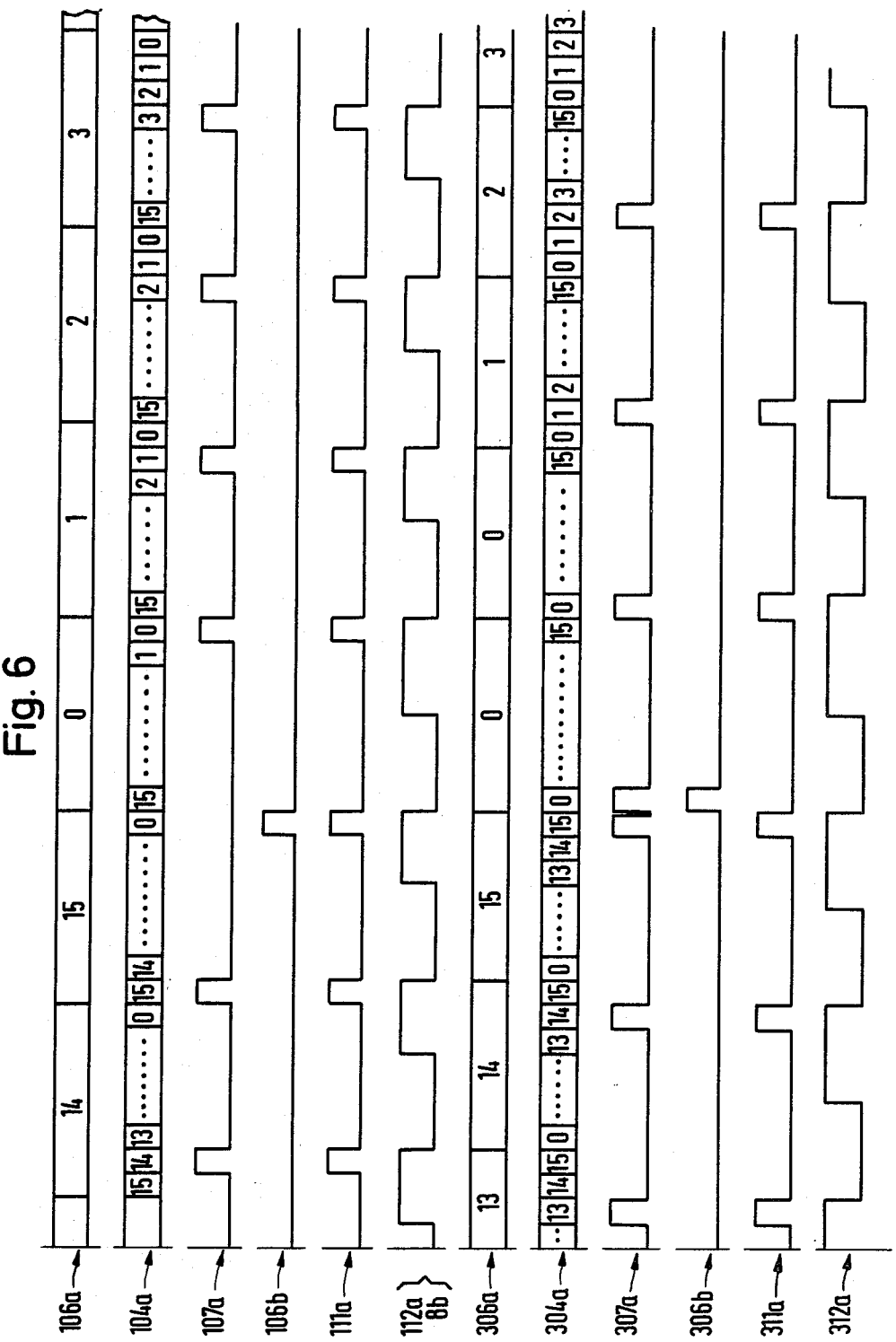

DATA TRANSMISSION SYSTEM

FIELD OF THE INVENTION

This invention relates to a data transmission system which provides for the introduction and suppression of extra information into the flow of transmitted and received data.

In digital data transmission systems, more particularly in fast PCM multiplex systems in which e.g. telephone and/or data channels are bunched and transmitted over beam links and/or cable, it is often required to transmit additional information independently of the amount of data to be transmitted and of the transmission bit rate. Extra information of this kind is necessary e.g. to control and synchronize facilities, such a ciphering devices, which have to be inserted into the transmission path in addition to the existing facilities and/or to be able to monitor and maintain an existing synchronization. It must be possible to transmit this additional or extra information without intervening in or modifying the existing facilities, nor must there be any alteration of the structure of the original information, more particularly the frame structure in PCM networks.

OBJECT OF THE INVENTION

It is an object of the invention to provide a system which meets these requirements.

SUMMARY OF THE INVENTION

The invention relates to a system for inserting extra-information bits into a bit sequence to be transmitted over a transmission channel and for suppressing such bits from the transmitted bit sequence, the system having an inserter at the transmitting end and a suppressor at the receiving end, the inserter converting an input bit sequence which it receives at a first repetition frequency into a second repetition frequency which is higher to correspond to the inserted extra bits, by the insertion of m extra bits per m.k.n. bits of the input bit sequence k, n and m denoting integers which are greater than zero, the suppressor restoring the original input bit sequence at the first repetition frequency and the extra information bits from the output bit sequence which it receives from the transmitter at the second repetition frequency.

In the system according to the invention, the inserter comprises first repetition frequency generating means which derive the output bit sequence repetition frequency from the input sequence repetition frequency and comply with the condition n.k. $\geq$ 50.

PRIOR ART

Facilities for inserting and suppressing extra information into and from a flow of digital data have been known for some time e.g. from UK Pat. No. 1 316 343, U.S. Pat. No. 4,025,720, German Pat. Specification No. 1 290 598 and German Offenlegungsschrift No. 2,423,090. However, all the known facilities have the disadvantage that they cannot be inserted into an existing data transmission system without action being taken thereon. The main reason for this is that none of these known facilities is an independent unit but is basically designed right from the start as a component of a data transmission system. Unfortunately, as a component of such a system they are designed for that particular system and are therefore inflexible as regards some parameters, such as more particularly the input and output bit rate. As a rule, the bit rates at which the flow of data as amplified by the extra information is transmitted is appreciably higher than the bit rates of the original flow of data so that the transmission channels must be designed in the first place to cope with the higher rates. Consequently, the known facilities cannot be removed from a transmission system nor introduced into one which was not designed for such facilities in the first place, for any such removal or insertion would make it necessary to alter the whole transmission channel including the transmitter and receiver. Another result of the known facilities being tailored to one particular transmission system is that they cannot be used in other transmission systems, such as those using different bit rates or different frame structures - i.e., they are not system-compatible. The facilities disclosed by the above specifications are therefore unsuitable for the purposes mentioned.

In the system according to the invention the relationship between the repetition frequencies of the output bit sequence and input bit sequence is $(1 + 1/n.k.)$. The factor n.k. is preferably very large, something like from $10^3$ to $10^5$ or more, so that the frequency difference between the two repetition frequencies is very small. This calls for special action to produce the output repetition frequency. Consequently, in a preferred development of the invention, the first repetition frequency generating means produce from the transmission-end input bit sequence repetition frequency: periodically, a first pulse group series which comprises n consecutive groups each containing k bits and in which adjacent pulse groups are phase-shifted relatively to one another in the same sense by the $n^{th}$ part of the pulse period of the last-mentioned repetition frequency; and, after each $n^{th}$ group of k bits each, an additional pulse, the first pulse group series co-operating with the additional pulses to form the repetition frequency of the transmitting-end output bit sequence at the said second repetition frequency. Also, the suppressor at the receiving end comprises second repetition frequency generating means producing periodically from the transmission-end output bit sequence repetition frequency a second pulse group series which comprises n consecutive groups of k bits each and in which adjacent pulse groups are phase-shifted relatively to one another by the $n^{th}$ part of the pulse period of the output bit sequence repetition frequency, the second repetition frequency, generating means suppressing one pulse after every $n^{th}$ group of k bits each, the second pulse group series less their pulses thus suppressed forming a repetition frequency at said first repetition frequency of the transmission-end input bit sequence. Generating repetition frequencies in this way has the advantage over the frequency synthesis method, which is usual practice elsewhere, of requiring much less outlay on circuitry; in particular, no high auxiliary or intermediate frequencies are needed.

BRIEF DESCRIPTION OF DRAWINGS

The system according to the invention will be described in greater detail hereinafter with reference to an embodiment.

In the drawings:

FIGS. 3a and 3b are diagrams and a block schematic diagram to explain the slotting-in of extra-information bits.

FIG. 6 shows pulse diagrams to explain the operation of the items to which FIGS. 4 and 5 refer.

DETAILED DESCRIPTION OF PREFERRED EMBODIMENT

Figure 4:
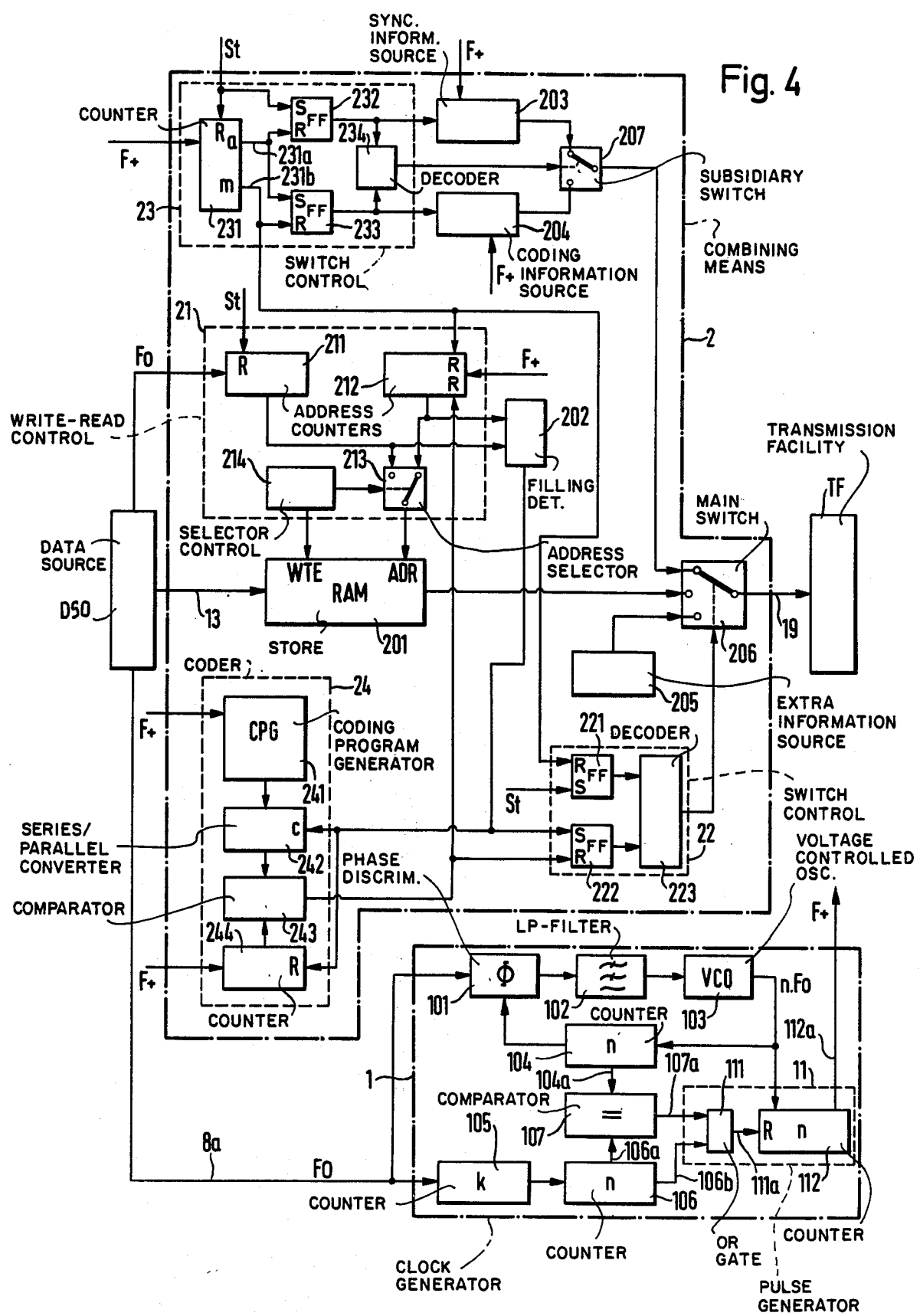
FIG. 4 is a block schematic diagram showing the construction of the inserter at the transmitting end of the system according to the invention.
Figure 5:
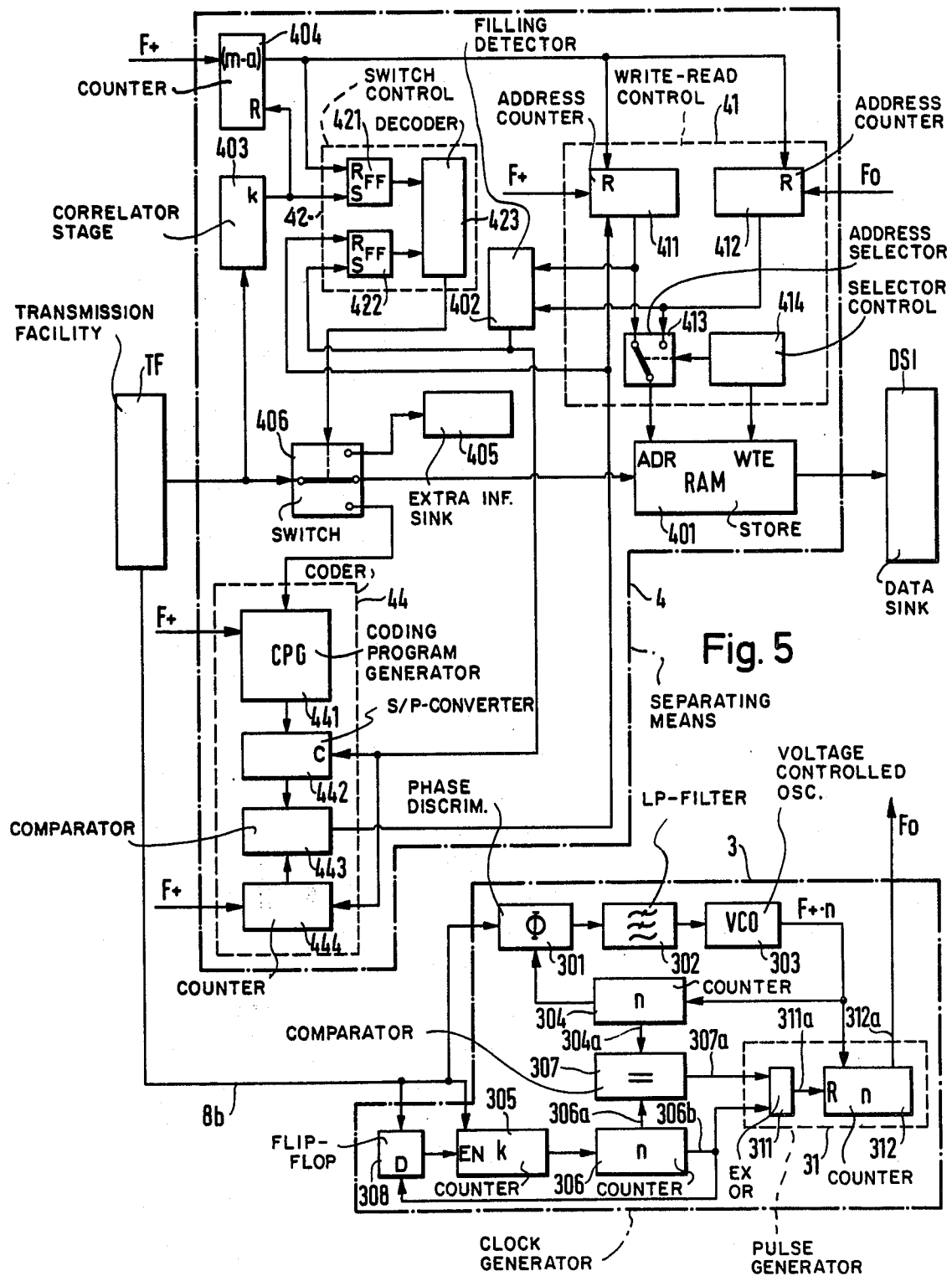
FIG. 5 is a block schematic diagram showing the suppressor at the receiving end of the system according to the invention.

The system shown in FIGS. 4 and 5 comprises an inserter (FIG. 4) and a suppressor (FIG. 5); in operation the inserter is disposed at the transmitting end between a data source DSO and a transmission channel TF of a digital data transmission system while the suppressor is disposed at the receiving end thereof between the channel TF and a data sink DSI. The inserter inserts extra-information bits into a flow of data which is supplied to it at a repetition frequency Fo and which will hereinafter be called the input bit sequence. The data flow which has had these extra-information bits added to it and which will hereinafter be called the output bit sequence leaves the inserter at a second repetition frequency F+ which is higher than the first or original repetition frequency Fo. The output bit sequence goes over the transmission channel to the suppressor at the receiving end, and the suppressor restores from the output bit frequency thus received the original input bit frequency at the transmitting end of repetition frequency Fo plus the extra-information bits.

The inserter mainly comprises two function groups - means 1 for producing the output bit sequence repetition frequency F+ from the input bit sequence repetition frequency Fo, and combining means which are controlled by the two latter frequencies and which slot the extra-information bits into the input bit sequence. Correspondingly, the suppressor at the receiving end comprises two function groups - means to restore the original repetition frequency Fo from the frequency F+; and separating means 4 which are controlled by the two latter frequencies and which serve to filter out the extra-information bits from the output bit sequence. For the sake of simplicity now and hereinafter, the repetition frequencies of the input bit sequence and output bit sequence and the repetitions - i.e., the pulse sequences of the respective repetitions frequencies - will be called the same.

Figure 1:
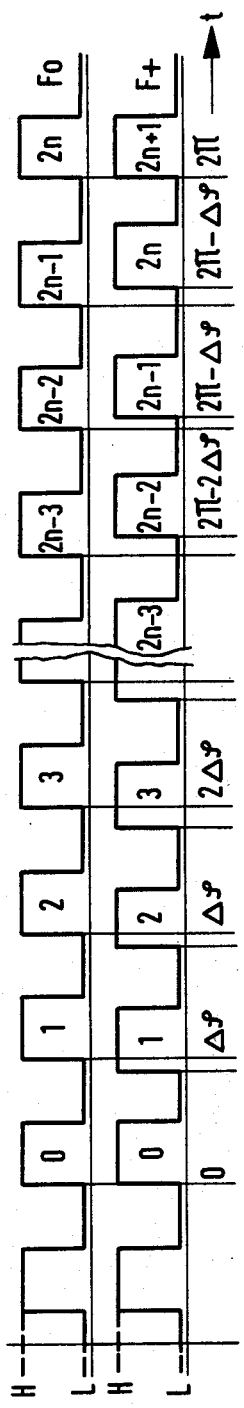
FIGS. 1 and 2 are pulse diagrams to explain a bit rate conversion.
Figure 2:
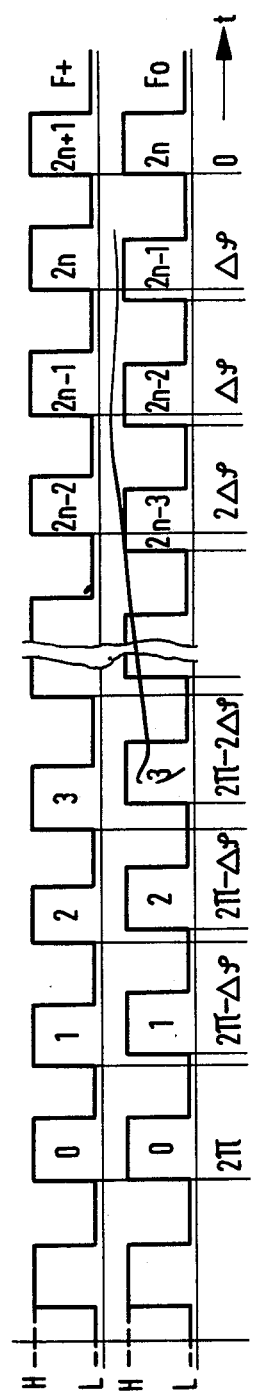

The theory behind the operation of the transmitting-end and receiving-end repetition frequency generating means can be gathered from the pulse diagrams in FIGS. 1 and 2; in both of these Figures the top line indicates the repetition frequency supplied to the generating means and the bottom line represents the repetition frequency derived from the generating means.

To produce the higher repetition frequency F+ from the lower frequency Fo, the interval between the $k^{th}$ and the $k+1^{th}$ pulse is periodically shortened by the $n^{th}$ part of the periodicity of Fo after a predetermined number k of pulses (after two pulses in the example shown), and after the $n^{th}$ shortening an additional pulse is inserted into the resulting gap. In other words, after k pulses there is a common phase shift of $\Delta \phi = 2\pi/n$, for the next k pulses, so that the n-times phase-shifted pulses lead on the corresponding pulses of the frequency Fo by one whole pulse period. An additional pulse - the pulse denoted by $2n+1$ in FIG. 1 - is then produced so that the phase difference is compensated for. The cycle then repeats.

A similar procedure is followed to restore the frequency Fo from the frequency F+, except that instead of the pulse intervals being shortened, they are lengthened by the $n^{th}$ part of the pulse period - i.e., there is a $\Delta \phi = 2\pi/n$ phase shift in the opposite direction. After n such lengthenings or phases shifts, one pulse - the pulse marked 2n in the drawings - of the repetition frequency F+ is simply jumped over and the cycle recommences.

In practice, of course, the pulse sequence generated after the alteration of the phase position of a pulse experiences a time shift relatively to the originating pulse sequence. Consequently, after each phase alteration of a pulse a new pulse sequence must be generated and subsequent alteration of the phase of a pulse is effected on a pulse of the new sequence, again with the result of a time-shifted pulse sequence. A detailed description will be given hereinafter with reference to FIG. 6.

As will be readily apparent, the repetition frequencies are in the following relationship to one another:

$$F+ = (1 + 1/n \cdot k)Fo \quad \text{and} \quad Fo = \frac{n \cdot k}{1 + n \cdot k} F+$$

In practice k is at least 10 and is preferably approximately from $2^4$ to $2^{15}$, while n is at least approximately $2^3$ and is preferably at least $2^4$ to $2^5$. Conveniently, n and k are such that the product n.k is at least approximately $2^{10}$, preferably at least approximately $2^{15}$. However, to simplify the illustrations in FIGS. 1, 2 and 6 and to help in understanding the invention, k is taken as 2 (FIGS. 1 and 2) and one (FIG. 6).

The theory behind the insertion of extra information into the input bit sequence can be gathered from FIGS. 3a and 3b. The top line of FIG. 3a shows a part of the input bit sequence and the bottom line 19 shows a part of the output bit sequence. For the rest, the numbering of the lines in the pulse diagrams of FIGS. 3a and 6 refers to the references of those lines in which the pulse sequences indicated therein occur.

The output bit sequence has been so compressed relativley to the input bit sequence that k.m.n. bits of the input bit sequence correspond to k.m.n. bits plus an additional m bits of the output bit sequence. The m additional bits, which represent the extra information, can be introduced into the data flow either all together, as shown, or, as will be explained hereafter, in any desired distribution.

FIG. 3b shows a block schematic diagram of an inserter for slotting in extra-information bits. The input bit sequence arriving via a line 13 from the data source (not shown in FIG. 3b) is written into an intermediate store 14 at the repetition frequency Fo present in lines 8 and 17 and is read out by way of a switch 16 to a line 19 going to a transmission channel or transmitter (not shown in FIG. 3b); the reading-out occurs at an output repetition frequency F+ which is present on line 18 and which is produced from the frequency Fo by a bit rate converter 12. By way of a control input 10 the switch 16 can be changed over a line 15 connected to a source (not shown) of extra-information bits.

At the beginning of transmission m extra-information bits (FIG. 3a) of repetition frequency F+ are read out of the intermediate store to line 9 and simultaneously the input bit sequence of frequency Fo is written into the store 14, whereafter the switch 16 changes over and the store contents are read out on to the higher-frequency line 19, while the input bit sequence continues to be written into the store, until the same is empty. This state of affairs occurs exactly after n.k.m. bits. The switch 16 then changes back and the cycle restarts.

A description will now be given of the construction and operation of the system according to the invention with reference to the detailed block schematic diagrams of FIGS. 4 and 5.

As already stated, the inserter which is shown in FIG. 4 and which is interposed between a data source DSO and the transmitting part TF of the transmission facility comprises repetition frequency generating means 1 to produce the frequency F+ from the frequency Fo, and combination means 2 for inserting exta-information bits into the input bit sequence.

The means 1 comprise a phase discriminator 101, a low-pass filter 102, a voltage controlled oscillator (VCO) 103, a modulo-n-backwards counter 104, a modulo-k-counter 105, a modulo-n-forwards counter 106, a comparator 107 and a pulse generator 11, the latter being embodied by an OR gate 111 and another modulo-n-counter 112.

The frequency Fo is supplied via a line 8a to the discriminator 101 and counter 105. The VCO 103, which co-operates with the discriminator 101, filter 102 and counter 104 to form a phase control loop (PLL), oscillates at a frequency n.Fo which is higher than the frequency Fo by the dividing ratio n of the counter 104. The counter contents which are present at outputs 104a and 106a of the two counters 104, 106 respectively in binary code form are represented in the first two lines of FIG. 6 for $n = 16$ by the panels numbered from 0 to 15. For the sake of simplicity k was taken to be 1 for the moldulo-k-counter. For $k > 1$ every panel would have to be present k times consecutively in the first line of FIG. 6, but there would be no other difference.

The comparator 107 compares the counter contents of the two counters 104, 106 and if they are equal delivers a pulse at its output 107a. When the counter 106 has passed through its counting cycle, it too outputs a pulse at its transmission output 106b. These pulses, shown in lines 3 and 4 of FIG. 6, are combined by OR gate 111 and act via line 111a to zero reset counter 112. The same counts the pulses of frequency n-Fo produced by the VCO 103 and produces at its highest-value output the pulse sequence shown in the last line of FIG. 6 with a duty cycle of approximately unity. The latter pulse sequence represents the higher output repetition frequency F+.

The comparator 107 produces pulse groups each containing k bits. The bit interval within any group is equal to the bit interval of the frequency Fo. Because of the simplifying assumption that $k = 1$, each pulse group in FIG. 6 consists of just a single pulse. Consecutive pulse groups are out of phase with one another in the same sense by $2\pi/n$ in each case. As can be seen in FIG. 6, after the $n^{th}$ pulse group there is a gap which the pulse generator 11 fills with the carry pulse produced by the counter 106.

Consequently, the pulse generator 11 embodied by orgate 111 and counter 112 is adjusted to the repetition rate of the pulse sequences produced by comparator 107 and interrupted by spaces at regular intervals, fills the spaces with the carry pulses produced by counter 106, and produces at its output 112a a uniform pulse sequence of the last-mentioned repetition frequency.

The combination means 2 comprise a write-read store having random access (RAM) 201, a write-read control 21, a filling detector 202 for the store 201, one source each for sync information 203, coding information 204 and extra information 205, a main switch 206 and associated switch control 22, a subsidiary switch 207 with associated switch control 23 and a coder 24.

The write-read control 21 comprises a write address counter 211 timed by the input frequency Fo, a read address counter 212 timed by the output frequency F+, an address selector 213 and a selector control 214 which so controls the selector 213 that after each timing pulse both of the store addresses determined by the address counters are applied to the store consecutively. The control also produces the write enable pulses for the store 201.

The detector 202 compares the write and read addresses and in the event of them being equal produces an output pulse.

The switch control 23 comprises a counter 231 operating at the frequency F+, two flip-flops 232, 233 and a decoder 234 which performs the actual switch control. When counter 231 reaches a value $a$ it outputs a signal at its output 231a and when it reaches a value m, the counter 231 outputs a signal at its output 231b.

The switch control 22 comprises two flip-flops 221, 222 and a decoder 223.

The coder 24 comprises a known coding program generator 241 operating at the frequency F+, a series-parallel converter 242, a comparator 243 and a modulo-m-counter 244 operatiing at the frequency F+. The generator 241 produces an aperiodic bit sequence, a predetermined number of which are taken over by the converter 242 at times determined by the detector 202 and are compared by comparator 243 with the state of the counter 244, which the detector 202 also resets. In the event of equality the comparator 243 produces a resetting pulse for the read address counter 212 and the flip-flop 222 in the control 22.

The system operates as follows:

At the start of data transmission the counters 231, 211 are zero reset via inputs St and the flip-flops 232–221 are operated so that the selectors 206, 207 go into the position shown in FIG. 4. The information arriving from the data source DSO via line 13 is now written into the store 201 bit for bit at the frequency Fo. Also, a bit sequence containing a bits and serving as sync information is read out of source 203 at the higher repetition frequency F+ and goes via switches 207, 206 and line 19 to the transmitting part of the transmission facility TF.

At the $a^{th}$ bit of sync information the counter 231 resets the flip-flops 233, 232, so that switch 207 changes over and a (m - a) bit code pulse sequence is read out of the source 204. The latter sequence serves to set the receiving-end coding program generator which will be described hereinafter.

When counter 231 reaches the state m, it sets the read address counter 212 to zero and changes back the flip-flops 233, 221, so that the main switch 206 goes into a position in which it links the store 201 to the transmission channel TF. The contents of the store 201 are read out at the frequency F+. Since the same is faster than the input repetition frequency Fo by the factor $(1+1/n.k)$, the store 201 will, if it has m places, be "empty" after a read-out of n.m.k bits - i.e., the read address and the write address will then exactly coincide. The detector 202 then delivers a pulse to the series-parallel converter 242, counter 244 and flip-flop 222, so that the converter 242 takes over the immediately available bit sequence, the counter 244 is zero reset and the flip-flp 222 is operated. The same changes over the main switch 206 into a position in which the extra-information source 205 is linked to the transmission channel TF.

A number of extra-information bits, such number being determined by the information produced by the coding program generator and stored in the converter 242, is now read out of the source 205 at the frequency F+; the data coming from the data source DS are written continuously into the store 201 at the frequency Fo so that the store starts to fill again. When the state of the counter 244 coincides with the contents of the converter 242, the comparator 243 resets the flip-flop 222 and the read address counter 212. The main switch 206 therefore returns to the position in which it links the store 201 to the transmission channel TF, and the contents of the store 201 start to read out again until the detector 202 finds that the store is empty, whereafter extra-information bits are read out of source 205, and so on.

As previously stated, the number of extra-information bits introduced into the flow of data per slotting step is controlled by the coding program generator. Of course, the series-parallel converter 242 must be so devised that the number of bits to be inserted which are present in encoded form at its parallel outputs is in the region of O-m. If m is e.g. 64, the series-parallel converter can be e.g. a six-place shift register. The coding program generator is of known construction and can be e.g. of the kind disclosed by U.S. Pat. No. 3,740,475.

It would of course be possible for the same number of extra-information bits always to be introduced into the data flow, in which event the stage 24 would be omitted, with a consequent reduction in circuitry. However, the advantage of introducing the extra information in dependence upon the coding program is that a possible adversary cannot detect where the extra information is in the data flow.

As previously stated, the receiving-end suppressor of the system according to the invention as shown in FIG. 5 comprises repetition frequency generating means 3, to restore the slower original input frequency Fo from the transmitted higher frequency F+, and separating means 4 to remove the extra-information bits from the incoming data flow.

The means 3 are of virtually identical construction to the transmitting-end means 1 and comprise a phase discriminator 301, a VCO 303, two modulo-n-counters 304, 306, a modulo-k-counter 305, a comparator 307, a D-flip-flop 308 and a pulse generator 31, the latter comprising an exclusive-OR gate 311 and another modulo-n-counter 312. The main difference from the means 1 at the transmitting end is the extra flip-flop 308 and the counter 304, which is a forwards counter at the receiving end and a backwards counter at the transmitting end.

The received frequency F+ supplied to the flip-flop 308, counter 305 and phase discriminator 301 via line 8b. VCO 303, which is associated with the phase discriminator 301, filter 302 and counter 304 to form a phase control loop (PLL), oscillates at a frequency N.F+ which is higher than the frequency F+ by the factor n. The counter states, which are present in binary code form at outputs 304a, 306a of the two counters 304, 306, are represented in the like-reference lines of FIG. 6 for n = 16 as panels numbered from 0 to 15. The same considerations apply to k as for the transmitting part.

The comparator 307 compares the contents of the two counters 304, 306 and if they are equal outputs a pulse of its output 307a. When the counter 306 has passed through its counting cycle, it also produces a pulse at its carry output 306b. These pulses, visible in the 9th and 10th lines of FIG. 6, are combined by or-gate 311. The carry pulse of counter 306 also goes to the D-input of flip-flop 308, so that counter 305 is cut off for the duration of a pulse. Consequently, after every k.n pulses the counter 306 takes up the O state twice consecutively (line 306a). The pulses produced at gate output 311a (line 311a) zero reset counter 312. The same is timed by oscillator 303 at the frequency n.F+ and produces at its highest-value output the pulse sequence which appears in the last line of FIG. 6 and which represents the restored frequency Fo which was the original input frequency at the transmitting end.

The comparator 307 produces pulse groups each consisting of k equidistant bits. Consecutive pulse groups have a phase lag on one another in the same sense of $2\pi/n$. As FIG. 6 shows, after n pulse groups there is no interval between the final pulse of the group and the first pulse of the next group. By means of the carry pulse produced by counter 306, the pulse generator 31 suppresses one of these two immediately adjacent pulses.

The pulse generator 31 is therefore adjusted to the repetition frequency of the pulse sequences produced by comparator 307 and having at regular intervals two immediately adjacent pulses, suppresses one of two such adjacent pulses and produces at its output 312a a uniform pulse sequence of repetition frequency Fo.

The separating means 4 comprise a write-read store with random access (RAM) 401 which has m places, a write-read control 41, a filling detector 402 for store 401, a correlator stage 403, a modulo-(m-a)-counter 404, a sink 405 for the extra information bits, a switch 406, a control 42 therefor and a coder 44.

The write-read control 41 comprises a write-address counter 411 timed by the frequency F+, a read-address counter 412 timed by the restored original input frequency Fo, an address selector 413 and a selector control 414 so controlling selector 413 that after each timing pulse both the store addresses determined by the address counters are applied to the store consecutively. The control also produces the write-enable pulses for the store 401.

The filling detector 402 compares the write and read addresses and if they are equal produces an output pulse.

The switch control 42 comprises two flip-flops 421, 422 and a decoder 423 which performs the actual switch control. Of course, the switches 406, 413, like the switches 206, 207 and 213 of the inserter at the transmitting end of the system, are electronic and not mechanical switches.

The coder 44 comprises a coding program selector 441 which is timed by the frequency F+, is of identical construction to the generator 241 at the transmitting end and in the same initial conditions produces the same coding as the generator 241, a series-parallel converter 442, a comparator 443 and a modulo-m-counter 444 also timed by the frequency F+. Both the coders 24, 44 are therefore identical and of course perform exactly the same duties as one another.

The suppressor at the receiving end operates as follows:

The incoming data flow goes to switch 406 and correlator 403. When the latter detects the a-bit sync sequence produced at the transmitting end, it responds by starting counter 404 and setting flip-flop 41. Consequently, switch 406 takes up a position in which it links the transmission channel to the generator 441.

The code pulse sequence following the sync bit sequence and containing (m-a) bits is now written into the coding program generator 441 so that the same is synchronized with the generator 241 at the transmitting end. Once the last bit of the code pulse sequence has been written in, the counter 404 outputs a pulse and therefore resets the flip-flop 421 and the two address counters 411, 412. The resetting of the flip-flop 421 changes over switch 406 into the position shown in which the transmission channel is connected to the store 401.

The incoming data flow at the higher frequency F+ is now written into the store and simultaneously read out of the store, at the slower frequency Fo, into the data sink DSI. Because of the difference between the frequencies F+ and Fo the store slowly begins to fill. It reaches its "full" state, in which the read-out and write-in addresses coincide, after exactly m.n.k. timing steps. When the filling detector 402 recognizes this state, it starts flip-flop 442, transmits an enabling pulse to the converter 442 and resets counter 444. The setting of the flip-flop 442 causes switch 406 to change over into a position in which it links the channel TF to the sink 405 for the extra-information bits required to be suppressed. As read-out continues from the store 401, the extra-information bits arriving from the transmission channel TF are suppressed into the sink 405. The number of bits suppressed is determined by the coding program generator and of course coincides with the number of bits which were inserted at the transmitting end.

When counter 444 reaches the state determined by converter 442, comparator 443 resets counter 411 and flip-flop 442. The same returns switch 406 to its central position illustrated, so that the data flow starts to be written into the store 401 again. When the store then fills up again, a further suppression occurs, and so on.

We claim:

1. A system for inserting extra-information bits into a bit sequence to be transmitted over a transmission channel and for suppressing such bits from the transmitted bit sequence, the system including at the transmitting end an inserter which inserts into an input bit sequence arriving at a first clock frequency m extra bits per m.k.n bits of the input bit sequence to produce an output bit sequence having a second clock frequency which is higher than the first clock frequency by the number of inserted extra bits, k, n and m denoting integers which are greater than zero, and further including at the receiving end a suppressor which filters out said inserted extra bits from the output bit sequence and thereby restores the original input frequency at the first clock frequency, said inserter comprising:
first clock generating means deriving from said input bit sequence at said first clock frequency a clock signal having a second clock frequency;
a first intermediate store;
first means for writing the input sequence thereinto at the first clock frequency and for reading out such sequence at the second clock frequency;
first fillig monitors for the first intermediate store;
a source for extra-information bits;
a source for a sync bit sequence;
a first selector for selectively connecting the first intermediate store, the source for extra-information bits, and the source for a sync bit sequence to the transmission channel;
a first controller which controls the first selector in dependence on the first filling monitors; and
a first coding stage connected to the first controller and controlling, according to a given coding program, aperiodically the number of extra-information bits to be inserted into the input bit sequence per insertion operation; and said suppressor comprising:
second clock generating means deriving from said output bit sequence at said second clock frequency a clock signal having said first clock frequency;
a second intermediate store;
second means for writing the transmission end output bit sequence into such store at the second clock frequency and for reading such bit sequence out of the store at the first clock frequency;
second filling monitors for the second intermediate store;
a sink for extra-information bits;
a second selector for selectively connecting the transmission channel to the input of the second intermediate store and the sink;
a second controller which controls the second selector in dependence on the second fillng monitors;
a sync bit sequence identifier which, when it identifies such a bit sequence, brings the second controller into the stand-by state, and
a second coding stage connected to the second controller and controlling, according to said given coding program, the number of extra-information bits which must be suppressed from the output bit sequence to restore the input bit sequence.

2. The system of claim 1 wherein the product n.k is at least 50.

3. The system of claim 2 wherein the product n.k is at least $10^3$.

4. The system according to claim 1 wherein the first clock generating means produce from the first clock frequency: periodically, a first pulse group series which comprises n consecutive groups each containing k bits and in which adjacent pulse groups are phaseshifted relatively to one another by the $n^{th}$ part of the pulse period of the last-mentioned clock frequency; and, after each $n^{th}$ group of bits each, an additional pulse, the first pulse group series together with the additional pulses constituting said second clock frequency of the transmitting-end output bit sequence.

5. The system according to claim 4 wherein the second clock generating means produce periodically from the second clock frequency a second pulse group series which comprises n consecutive groups of k bits each and in which adjacent pulse groups are phase-shifted relatively to one another by the $n^{th}$ part of the pulse period of the second clock frequency, and suppressing one pulse after every $n^{th}$ group of the k bits each, the secondpulse group series constituting said first clock frequency of the transmission-end input bit sequence.

6. The system according to claim 4 wherein n is from 8 to 32.

7. The system according to claim 4 wherein k is from $2^4$ to $2^{15}$.

8. The system according to claim 5 wherein the first and second clock frequency generating means each comprise: a phase control circuit controlled by the clock frequency of the respective bit sequence (input or output bit sequence) and a first backwards or forwards counter; a second counter incremented by the clock frequency of the respective input or output bit sequence; a comparator comparing the contents of the two counters and outputting a signal in the event of coincidence; and a pulse generator actuated by the comparator, the pulse generator adjusting itself to the clock frequency of the predetermined minimum number of equally spaced consecutive input signals and producing at its output a constant pulse sequence generated from the last-mentioned frequency.

9. The system according to claim 5 wherein the first and second clock frequency generating means each comprise: a phase control circuit controlled by the clock frequency of the respective bit sequence and a first backwards or forwards counter a second counter incremented by the clock frequency of the respective input or output bit sequence; a pulse generator; a third counter which is connected to the output of the second counter and which transmits a pulse to the pulse generator at the end of its counting cycle; and a comparator which compares the contents of the first and third counter and in the event of their coincidence outputs a signal to the pulse generator; and the pulse generator of the first clock frequency generating means generates an output pulse from each input pulse - and the pulse generator of the second clock frequency generating means generates an output pulse - only in the absence of signal from the third counter.

10. The system according to claim 1 wherein the first controller brings the first selector into a position in which the same connects the extra-information bits source to the transmission channel when the first filling monitors indicate the "empty" state of the first intermediate store; the first coding stage produces first break-off signals; and in the presence of such a signal the first controller brings the first selector into a position in which the same connects the first intermediate store to the transmission channel; and the second controller brings the second selector into a position in which the same connects the transmission channel to the extra-information bitssink when the second filling monitors detect the "full" state; the second coding stage produces a second break-off signals, and in the presence of such a signal the second controller brings the second selector into a position in which the same connects the transmission channel to the second intermediate store.

* * * * *

UNITED STATES PATENT AND TRADEMARK OFFICE
CERTIFICATE OF CORRECTION

PATENT NO. : 4,151,373
DATED : April 24, 1979
INVENTOR(S) : Walter R. Widmer et al It is certified that error appears in the above-identified patent and that said Letters Patent are hereby corrected as shown below:

Column 2, line 51, after "at" insert --the--;

line 68, change the "period (.)" to --semi-colon(;).

line 61, after "over" insert --to--.

Column 5, line 61, change "orgate" to or gate--.

Column 6, line 29, change "operatiing" to --operating--.

Column 7, line 58, after "F+" insert --is--.

Column 8, line 58, change "selector" to --generator--.

Column 9, line 66, change "fillig" to --filling--.

UNITED STATES PATENT AND TRADEMARK OFFICE
CERTIFICATE OF CORRECTION

PATENT NO. : 4,151,373

DATED : April 24, 1979

INVENTOR(S) : Walter R. Widmer et al

It is certified that error appears in the above-identified patent and that said Letters Patent are hereby corrected as shown below:

Column 10, line 28, change "fillng" to --filling--;

line 60, change "secondpulse" to --second pulse--.

Signed and Sealed this

Thirtieth Day of October 1979

[SEAL]

Attest:

RUTH C. MASON
Attesting Officer

LUTRELLE F. PARKER
Acting Commissioner of Patents and Trademarks